United States Patent [19]

Hodgson et al.

[11] 3,823,414

[45] July 9, 1974

[54] MAGNETIC RECORD APPARATUS WITH SWITCHING MEANS TO SELECT TAPES AND INTERRUPT FOR ANNOUNCEMENTS

[75] Inventors: Philip Hodgson, St. Martins; Robert Thomas Munson, St. Peter; Gordon Howard Reed, St. Ouen, all of England

[73] Assignee: Television Research Limited

[22] Filed: Sept. 19, 1972

[21] Appl. No.: 290,323

[30] Foreign Application Priority Data

Sept. 20, 1971 Great Britain .................... 43706/71

[52] U.S. Cl. .......... 360/64, 179/1 G, 179/100.1 TD

[51] Int. Cl. ........................ G11b 5/56, G11b 15/16

[58] Field of Search ........ 179/100.1 TD, 100.2 MD, 179/100.2 R, 1 G, 1 GQ

[56] References Cited

UNITED STATES PATENTS

| | | | |
|---|---|---|---|
| 2,932,696 | 4/1960 | Shipman, Jr. | 179/100.1 TD |
| 2,941,044 | 6/1960 | Volkman | 179/100.1 TD |
| 3,135,836 | 6/1964 | Schwartz et al. | 179/100.1 TD |
| 3,158,695 | 11/1964 | Camras | 179/100.1 TD |
| 3,246,081 | 4/1966 | Edwards | 179/1 G |
| 3,718,773 | 2/1973 | Berkovitz | 179/100.1 TD |

*Primary Examiner*—Alfred H. Eddleman
*Attorney, Agent, or Firm*—Laurence R. Brown

[57] ABSTRACT

In magnetic record apparatus for sound distribution systems it is desirable to have automatic means for switching from one tape to the next at the end of each tape program, to select one of a number of tapes and to interupt the playing of the tapes to make announcements and the like. Such a magnetic record apparatus includes a signal path switching arrangement in which a signal path may be established between a terminal of a plurality of terminals of one kind and a terminal of another kind through the intermediary of a semiconductive control device said device being arranged to establish or block said signal path by application to at least one control electrode thereof of a control potential.

29 Claims, 10 Drawing Figures

Figure 1:
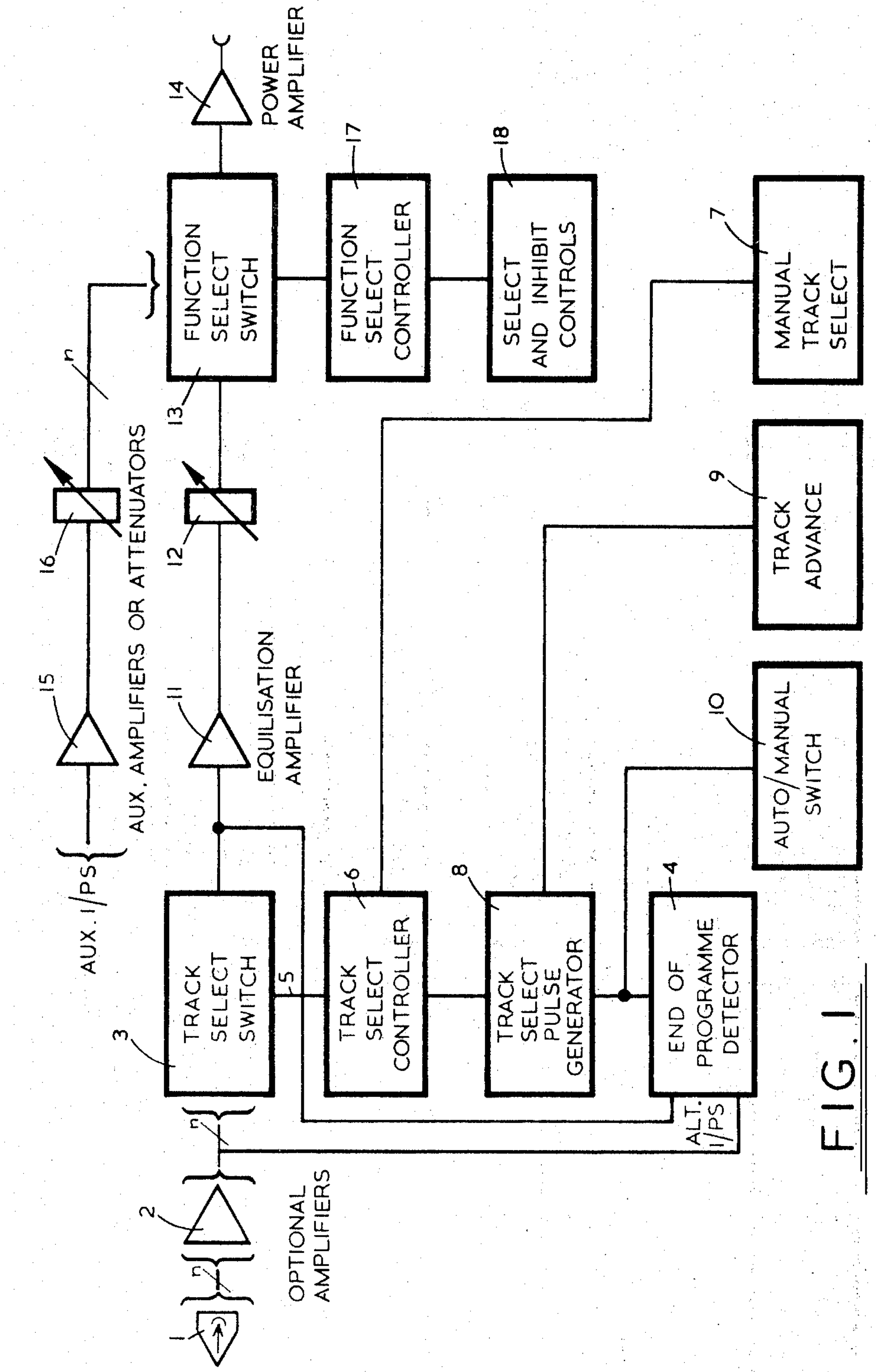

MAGNETIC RECORD APPARATUS WITH SWITCHING MEANS TO SELECT TAPES AND INTERRUPT FOR ANNOUNCEMENTS

This invention relates to magnetic record apparatus and seeks to provide an improved form thereof.

According to one aspect of the invention, there is provided a magnetic record apparatus which includes a signal path switching arrangement in which a signal path may be established between a terminal of a plurality of terminals of one kind and a terminal of another kind through the intermediary of a semi-conductive control device said device being arranged to establish or block said signal path by application to at least one control electrode thereof of a control potential.

According to another aspect of the invention, there is provided a magnetic record apparatus which includes a signal path switching arrangement in which a signal path may be established between a terminal of a plurality of input terminals and an output terminal through the intermediary of a semi-conductor control device, said device being arranged to establish or block said signal path by application to at least one control electrode thereof of a control potential.

According to another aspect of the invention, there is provided a magnetic record apparatus which includes a signal path switching arrangement in which a signal path may be established between an input terminal and a terminal of a plurality of output terminals through the intermediary of a semi-conductor control device, said device being arranged to establish or block said signal path by application to at least one control electrode thereof of a control potential.

According to another aspect of the invention, there is provided a magnetic record apparatus which includes a signal path switching apparatus in which a pair of signal paths may be established between a pair of a plurality of terminals of one kind and a pair of terminals of another kind through the intermediary of a pair of semi-conductive control devices, said devices being arranged to establish or block said pair of signal paths by the application to at least one control electrode of each device of a control potential.

A semi-conductive current control device may be associated with each of the plurality of input terminals and be arranged to have a corresponding control potential applied to it over a respective control potential line. The control potentials may be arranged to be generated by an assembly of bi-stable multi-vibrators so interconnected as to establish and block the signal paths in a pre-determined sequence in response to successive switching signals applied to said assembly of bi-stable multi-vibrators.

The signal path switching arrangement may, for example, be utilised to select which of a plurality of tracks, or pairs of tracks, of a magnetic record are to be reproduced at any particular instant of time or to determine whether signals derived from a magnetic record or from some other source, such as a microphone, are to be reproduced by the magnetic record apparatus.

Figures 2, 3A, 3B:
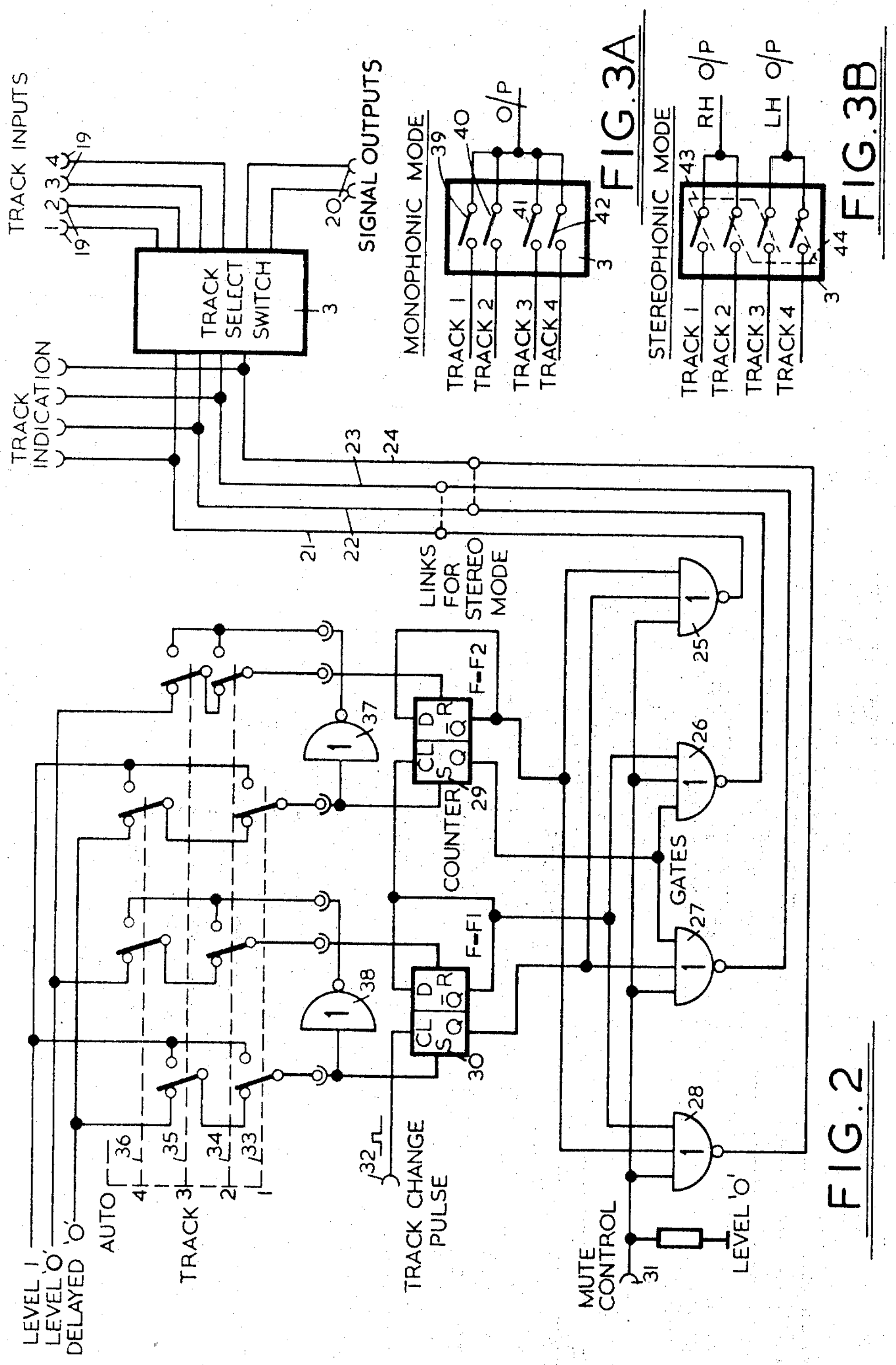
Figure 4:
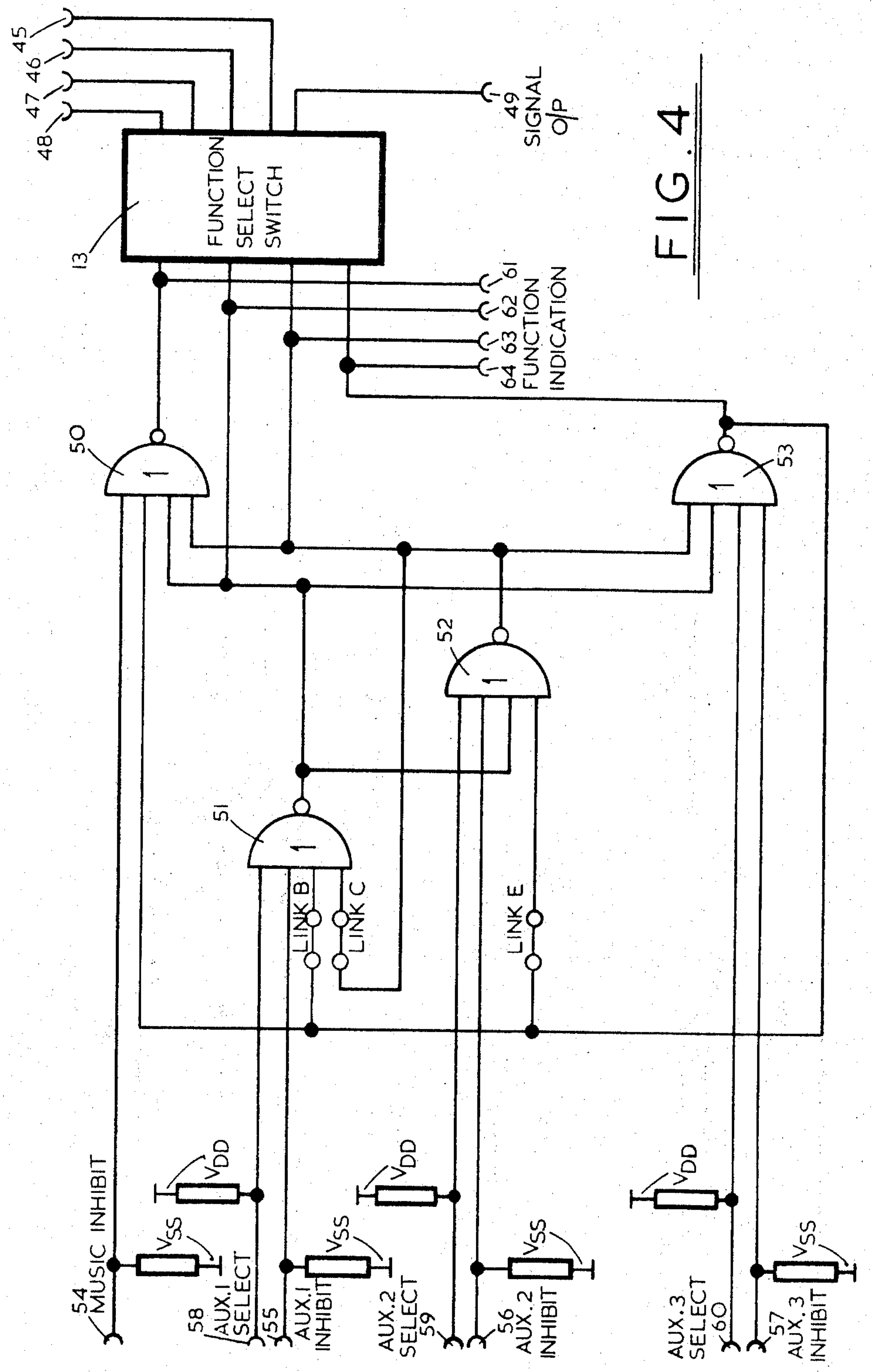
Figure 5:
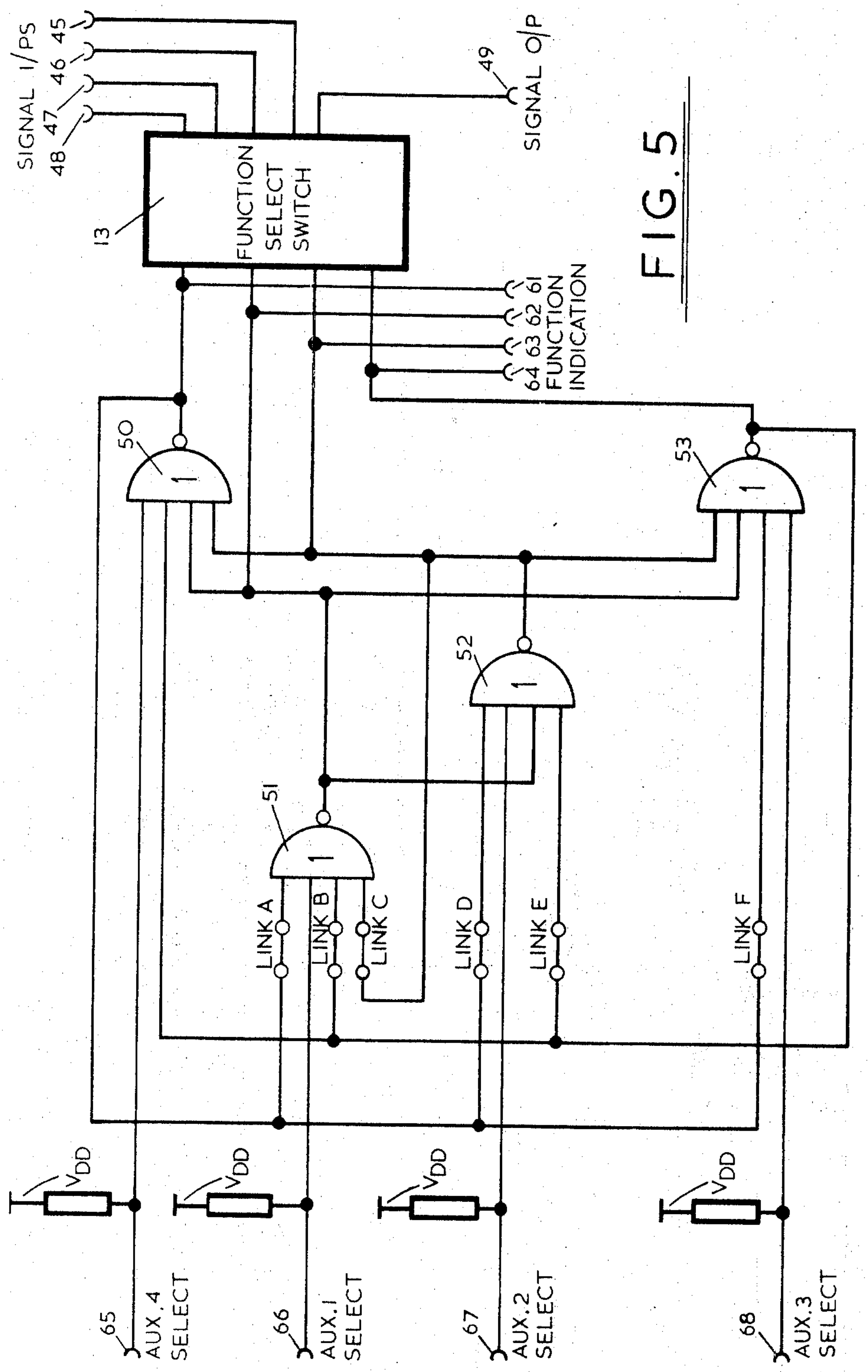
Figure 6:
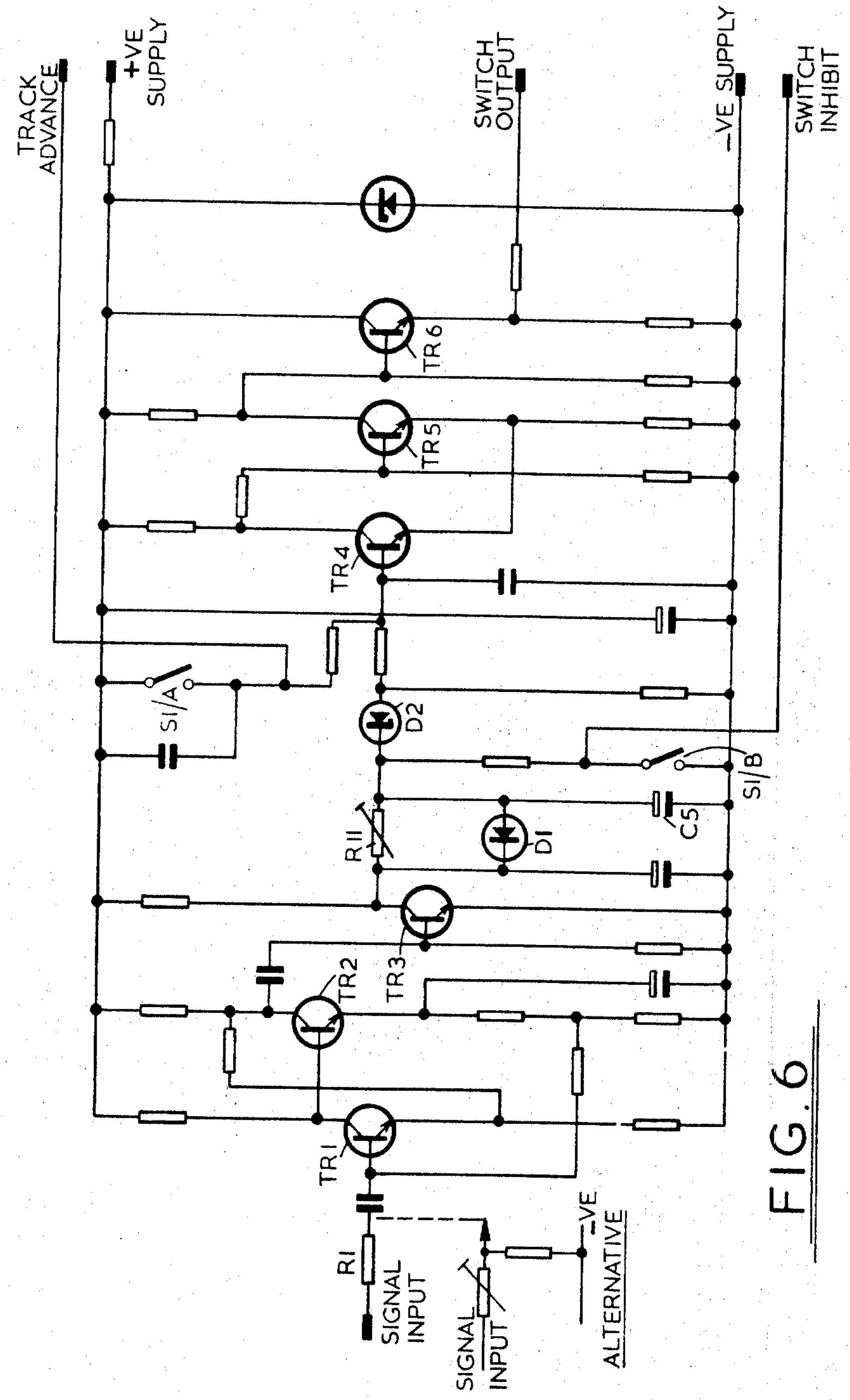
Figure 7:
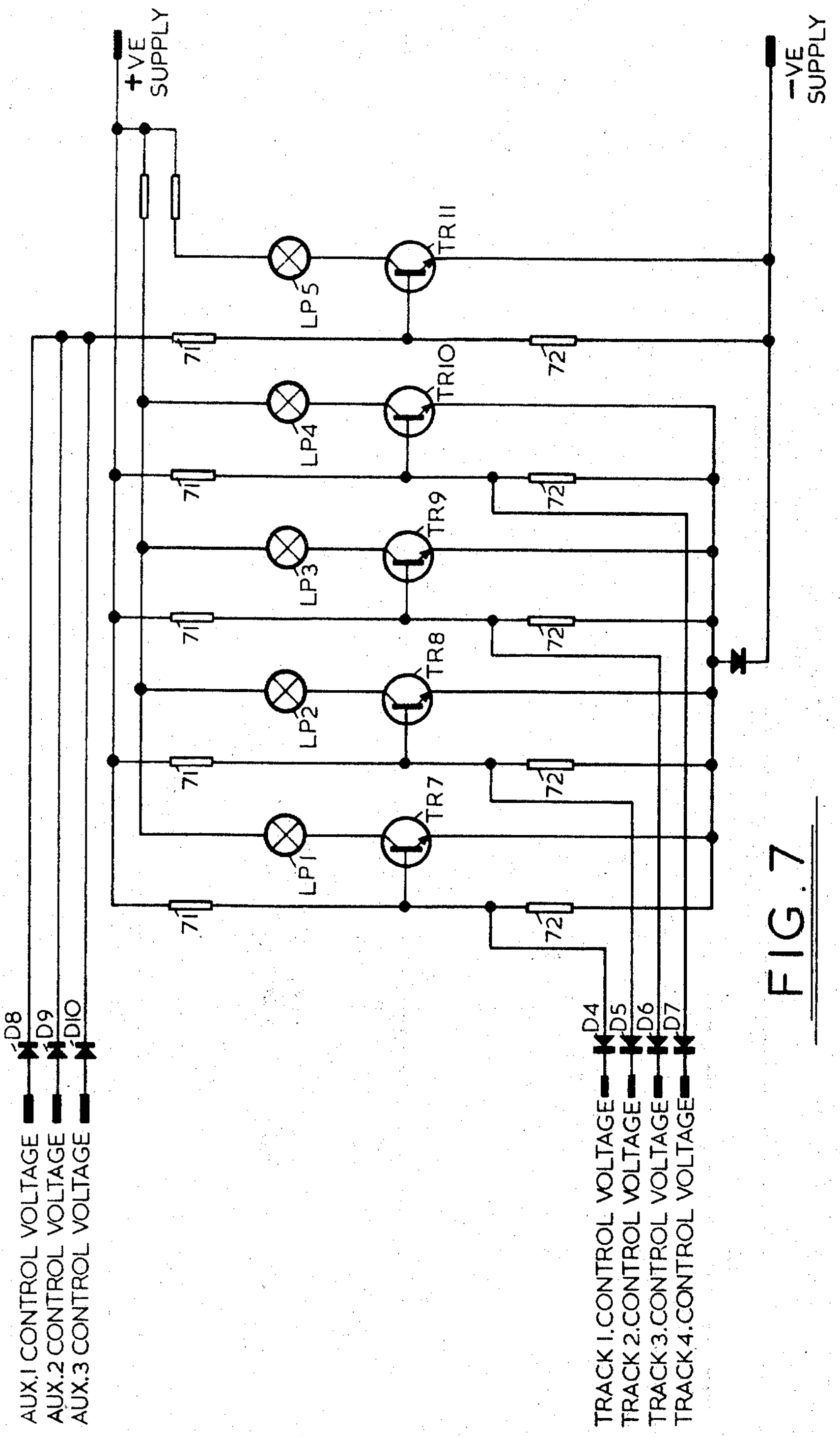
Figure 8:
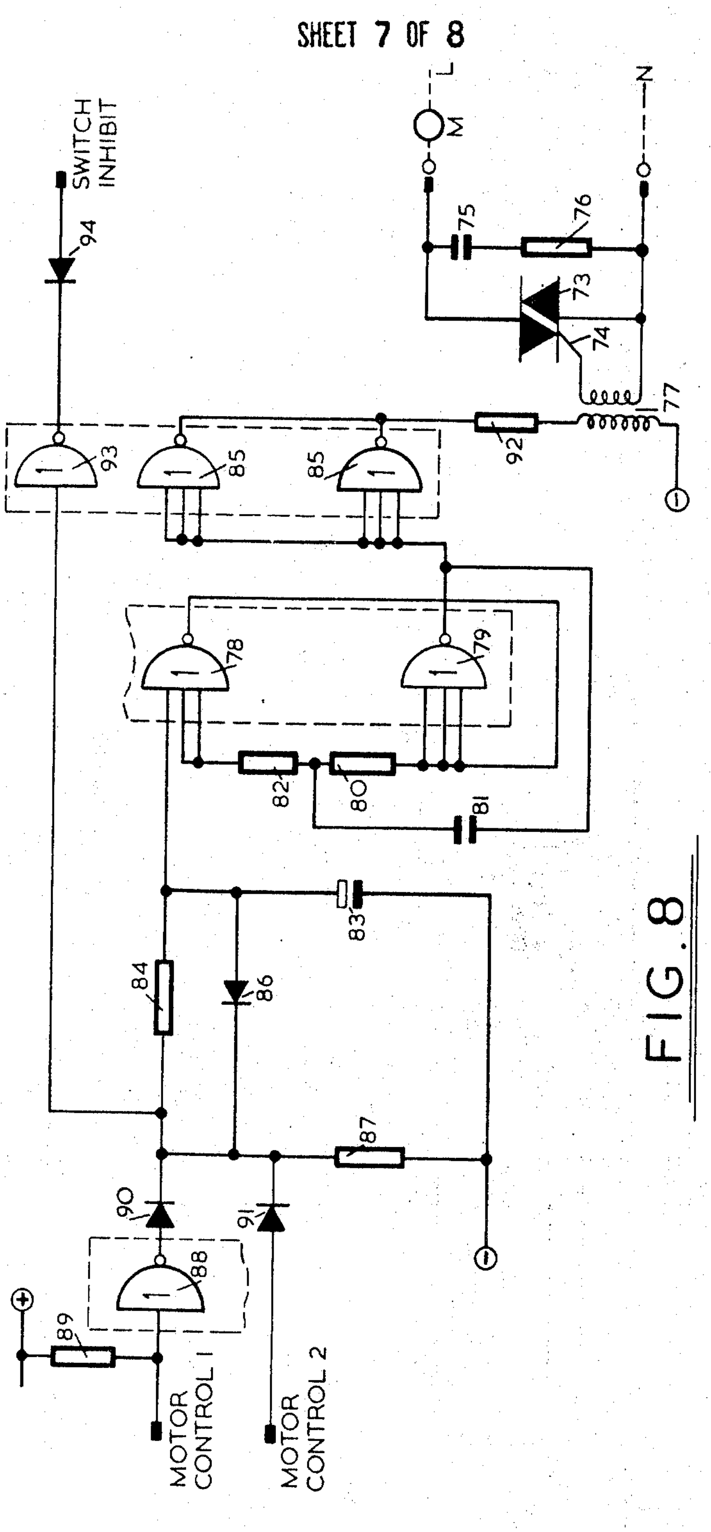
Figure 9:
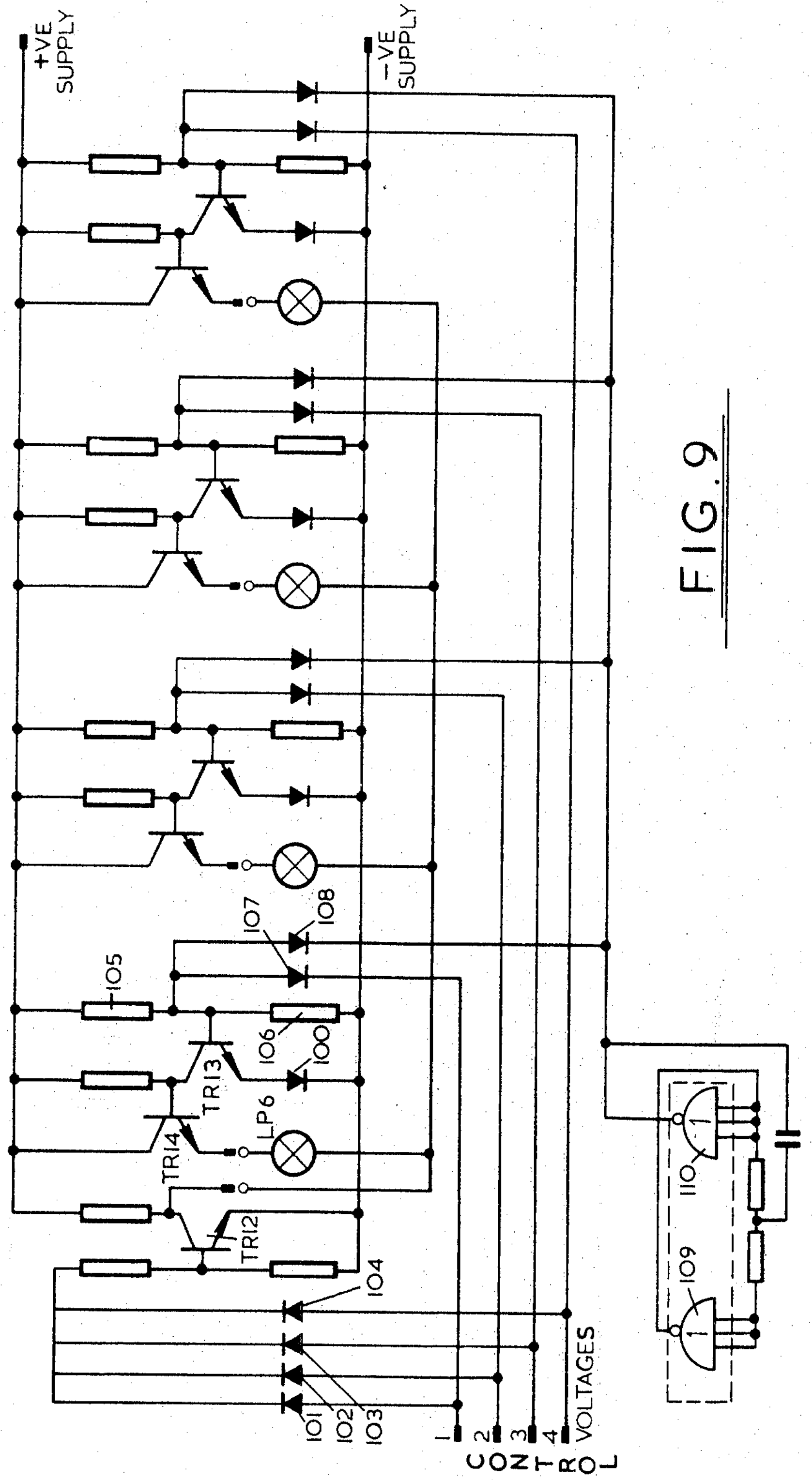

Embodiments of the invention will now be described, by way of example, with reference to the accompanying drawings in which:

FIG. 1 is a block schematic diagram of a magnetic record apparatus in accordance with the present invention, FIG. 2 is a detailed block schematic of a signal path switching arrangement in the apparatus shown in FIG. 1, FIGS. 3A and 3B are functional diagrams illustrating the operation of part of the arrangement shown in FIG. 2, FIG. 4 is a detailed schematic diagram of one form of function switching arrangement in the apparatus shown in FIG. 1, FIG. 5 is a detailed schematic diagram of another form of function switching arrangement in the apparatus shown in FIG. 1, FIG. 6 is a circuit diagram of a suitable end of programme detector for use in the arrangement of FIG. 1, FIG. 7 is a circuit diagram of an indication arrangement for indicating the track of auxiliary channel selected, FIG. 8 is a schematic diagram of a tape drive motor control circuit, and FIG. 9 is a circuit diagram of an auxiliary channel selection indicator and busy line indicator.

The magnetic record apparatus shown in the drawings is a four track playback unit for monophonic operation which is arranged also to be capable of reproducing signals derived from an auxiliary source. Referring to FIG. 1 the signals are derived from the tape by separate or combined playback heads arranged to be responsive to signals on the four tracks and indicated diagramatically at 1. The signals from the head in respect of each record track are applied to a corresponding pre-amplifier shown diagramatically at 2, the amplified signals being applied both to a signal path switching arrangement forming a track selection switch 3 and to an end of programme detector 4. The track selection switch 3 comprises a semiconductive current control device associated with the signal path in respect of each record track which may be established between a corresponding input terminal and a common output terminal. Each semi-conductive current control device is arranged to have a corresponding control potential applied to it over a respective control potential line shown diagramatically at 5. Each semi-conductive current control device may conveniently comprise the drain-source paths of field effect transistors which may conveniently be one of a plurality of such transistors contained in a complementary MOSFET integrated circuit such, for example, as the RCA type CD 4016. The control potentials are generated by a track selection controller 6 which may comprise an assembly of bi-stable multi-vibrators. These may conveniently comprise an RCA COSMOS logic arrangement, which is notable for its low current drain. It will be appreciated that other logic systems may be substituted for that employed here and that the type CD 4016 integrated circuit may be replaced by corresponding P channel devices provided the logic is reversed. In the arrangement described the logic level 1 is positive supply ($V_{DD}$) and logic level 0 is negative supply ($V_{SS}$). This may be either an actual negative supply or the common conductor of the equipment. In the case of an actual negative supply being used for logic level 0 it may be possible to switch signals of greater amplitude.

The particular input selected by the track selection switch 3 is determined by the track selection controller 6. This may be programmed in any of a number of ways some of which will be described in detail later. In addition it may be arranged to provide for the continuous selection of any particular input by means of an associated manual track selector 7. In one mode of operation the controller 6 is arranged to select each of a plurality of inputs to the switch 3 in a predetermined sequence in response to successive switching signals applied to it from a track select pulse generator 8 which derives its control signals from the detector 4. The detector 4 may be arranged to be responsive to additional signals present on the various inputs to the switch 3 such, for example, as bursts of tone having a frequency outside the band occupied by the main signals carried by the magnetic record. In order for the track selection sequence to be advanced at any time during its automatic cycle there is provided a track advance actuator 9, the actuation of which is arranged to cause the pulse generator 8 to generate a pulse for application to the controller 6 irrespective of its operating conditions at that time. A further switch 10 is also provided by means of which the operation of the generator 8 may be inhibited. Under these conditions whichever input is selected by the switch 3 at the moment switch 10 is operated remains so selected until either the state of switch 10 is restored or the track advance switch 9 is actuated.

The signal selected by the switch 3 may be passed to an equalising amplifier 11 in order to process the signal to produce the required frequency response at a suitable amplitude, following which is an adjustable volume control 12. If desired, the equalisation and volume control could take place between the heads 1 and the switch 3. In addition the input to the detector 4 may alternatively be derived from the output of the switch 3 instead of individually from the plurality of inputs thereto.

Alternatively a separate record track may be provided for carrying signals for application to the detector 4 in which event said track is provided with a corresponding pick-up head and, if required, its own preamplifier. In such an arrangement the signals from the control track will allow the selection of any of the information tracks to be changed at will during operation. This could, for example, permit the replay of a desired message made up by variable elements recorded on different tracks of the tape. The sequence of track selection may additionally be controlled either automatically or manually, for example, by means of a punched card, the control signals from the separate control track serving as synchronizing signals, the actual track selection at various times being determined by said automatic or manual means.

The signal from the volume control 12 may be applied to a function selection switch 13 which may be of similar form to the track selection switch 3. The switch 13 may be arranged to be effective to provide to the input terminals of a power amplifier 14 signals from the volume control 12 or alternatively one of a plurality of auxiliary input signals each of which may previously have passed through a corresponding pre-amplifier, indicated diagramatically at 15, and a corresponding volume control, indicated diagramatically at 16. The operation of the switch 13 may be controlled by a function selection controller 17 similar in form to the track selection controller 6 and may have associated with it manual selection and inhibit controls as shown diagramatically at 18.

The signal path switching arrangement is shown in more detail in FIG. 2. The input signals from the four tape tracks are applied to input terminals 19 from which they are passed to the track selection switch 3 and from which an output signal may be derived from the terminals 20. The particular track selected is determined by the application of a logic 1 voltage to the appropriate one of the control lines 21, 22, 23, 24, whilst the remaining lines have applied to them a logic 0 voltage. The voltages applied to these control lines are provided by corresponding logic NOR gates 25, 26, 27, 28, each of which has three inputs. Two of these inputs are derived from the counters 29, 30, whilst the third input is from a mute control 31. The counters 29, 30, comprise a two-stage binary counter having set-reset capabilities and giving four signal state. That is the following combinations of two logic 0's are available:

| | |
|---|---|
| $\overline{Q1}$ | $\overline{Q2}$ |
| $Q1$ | $Q2$ |
| $\overline{Q1}$ | $Q2$ |
| $Q1$ | $\overline{Q2}$ |

These four states are detected by the four NOR gates 25 – 28 each of which is arranged to provide on its output line a logic 1 voltage when its inputs are all in the logic 0 state. Therefore, only one gate can have a logic 1 output at any one time. In the arrangement shown the gates 25 – 28 are so arranged that as the counters 29, 30 count, the gates actuate the track selection switch 3 so as to select the record tracks in the order track 1, track 2, track 3, track 4, track 1 etc.

If a logic 1 voltage is applied to the set terminal S of the counters 29, 30 the $\overline{Q}$ output is 0 while if a logic 1 is fed to a reset terminal R the Q output is 0. It is possible by taking different combinations of these terminals for the two counters 29, 30 to logic level 1 to force the counter to a particular count and if the connection is maintained the count will not be changed by any track change pulses applied at the terminal 32. In order to prevent false operation in the vent that two of the manual selection switches 33, 34, 35, 36, are actuated simultaneously the reset terminals R are fed from the selection switches via a corresponding inverter 37, 38 having its input connected to its corresponding set terminal S. Hence it is impossible to have a logic 1 on both the set and reset terminals of the same counter 29, 30 since if the set terminal S is a logic 1 the output from the associated inverter 37, 38 must be at logic 0.

When automatic operation is selected all the set and reset terminals of the flip-flops 29, 30 are taken to logic level 0 and their operation controlled solely by pulses applied to the terminal 32. However, in order to ensure that the track selection switch 3 will be positioned to select track 1 when the apparatus is first switched on the two set terminals S of the flip-flops 29, 30 are connected momentarily to the logic 1 voltage thus forcing the counter to the state selecting track 1. In the particular application of this circuit complementary MOSFETs are used for the logic circuits as these draw very little current allowing the apparatus effectively to have a built-in memory. The supply to the logic circuit is fed from a reservoir capacitor which is isolated from the remaining power supplies by a diode which is forward biased in normal operation but which prevents the capacitor discharging via these supplies when the unit is switched off. The time interval during which the capacitor holds its charge is determined by the various leakage currents. A period of three days has been achieved with one example constructed in accordance with the present invention. During this time the logic circuit remains in the same state that it held when the unit was switched off thus, if the playback unit is switched on during this time the track selected will be that which was being played back when the unit was switched off. If the unit is switched off for longer than this memory period the unit will switch to track 1 when switched on. The length of the memory may be varied by altering the value of the capacitor or leakage current. The output voltages from the gates 25–28 are available for signalling or other purposes. The circuit arrangements used are preferably designed not to draw any appreciable current when the unit is switched off as this current drain will affect the memory time just described.

If the outputs of the gates 25 and 27 corresponding to tracks 1 and 3 are linked and similarly the outputs of gates 26 and 28 corresponding to tracks 2 and 4 are linked (as shown dotted in FIG. 2) two stereo programmes may be switched the sequence being 1 and 3, 2 and 4, 1 and 3 etc.

The third output of the gates 25 – 28 can be used as inhibit controls to allow the signals from the magnetic record to be muted. If the terminal 31 is taken to logic level 1 the gate outputs are 0 and the associated switches are off. An alternative method of muting will be described in connection with FIGS. 4 and 5 and may be used to mute the signals derived from individual tracks or groups of tracks of the magnetic record depending upon the connections of these inputs.

FIGS. 3A and 3B show diagramatically the effective function of the track selection switch 3. In FIG. 3A the switch is arranged to function as four single pole single throw switches 39, 40, 41 and 42 which are effective to connect any one of the inputs relating to the four tracks of the magnetic record to a common output line. For operation in the sterophonic mode the arrangement of FIG. 3B is adopted in which the switch functions as two double pole single throw switches 43, 44 by means of which in one condition track 1 may be passed to an output line in respect of right hand signals and track 3 to another output line in respect of left hand signals, whilst in the other mode track 2 is connected to the right hand signal line and track 4 to the left hand signal line.

FIG. 4 shows in more detail one arrangement of the function control switch of FIG. 1. The switch 13 which is similar to the switch 3 and is arranged to receive input signals from four terminals 45, 46, 47, 48 and to provide a selected one of these at an output terminal 49. The signals applied to the terminals 45 - 48 may comprise signals in respect of the selected track of the magnetic record (previously selected by the switch 3) and signals from one of three auxiliary sources. The number of input signals which may be switched may be increased or decreased at will by suitable modification of the switching controller. This switching controller is formed by a logic arrangement comprising four, four input NOR gates 50, 51, 52, 53.

One input of each gate is taken to logic level 0 ($V_{SS}$) through a resistor in order to provide an inhibit control. If these inputs are connected, for example, through the intermediary of control switches connected to their corresponding terminals 54, 55, 56, 57, to logic level 1 the output of the associated NOR gate will be a logic 0 and the function select switch 13 in respect of that particular channel will be open irrespective of the position of any other control. This facility may be used, for example, for barring a particular auxiliary input to all except authorised users provided with access to the inhibit switch, or to mute the music input by means of a time switch.

A second input on three of the NOR gates 51, 52 and 53 is taken to logic level 1 ($V_{DD}$) through a resistor so that unless these inputs are taken to logic 0 by means of an external switch associated with the corresponding terminals 58, 59 and 60 the outputs of these three gates will be logic 0 and hence the switches associated with them will be open. The outputs from each of these gates 51, 52, 53 are taken to an input of the fourth gate 50 which if the inhibit control is at logic 0 will have four logic 0 inputs causing its output to be logic 1 thus effectively closing the switch relating to this channel. In the example shown this will permit signals from the magnetic record to be reproduced.

If the 'Auxiliary One' select terminal 58 is taken to logic 0 the inputs to gate 51 will all be at logic 0 causing the output to become logic 1 and closing the swtich relating to this channel so permitting the reproduction of signals applied to the terminal 46. As the output of the gate 51 is taken to all the other gates 50, 52, 53, the gate 50 will have a logic 1 input and hence a logic 0 output and the signal from the magnetic record be muted. The logic 1 inputs to the other gates 52 and 53 will prevent their outputs going to the logic 1 state even if their associated selected terminals 59 and 60 are connected to logic 0. Thus the signal on the Auxiliary One channel cannot be interrupted by another channel. When the terminal 58 is disconnected from logic 0 and restored to logic 1 the output of the gate 51 will return to logic 0 placing, in the absence of another auxiliary channel having been selected, four logic 0's on the gate 50 and hence restoring the signal from the magnetic record.

The action of taking the 'Auxiliary Two' select or 'Auxiliary Three' select terminals 59 and 60 respectively to logic 0 is similar to that described for Auxiliary One select.

The facilities provided by this circuit are the selection of one out of three signal sources with a fourth signal source being provided when none of the three signal sources has been selected, the priority of selection being on a 'first come, first served' basis, inhibition of any source being available.

The outputs of the gates 50 – 53 are taken out via terminals 61 – 64 for signalling purposes either direct to the individual indicator circuit or via additional gates to group the function indicators.

It will be seen that if link E is removed then the logic 1 from gate 53 associated with the Auxiliary Three input will not be fed to gate 52 associated with the Auxiliary Two input. Hence if Auxiliary Two select terminal 59 is taken to logic 0 and 'Auxiliary Two' inhibit is not at logic 1 then the output of the gate 52 will be a logic 1, selecting this auxiliary input for amplification and, since the output of the gate 52 is taken to gate 53 associated with the Auxiliary Three input inhibiting signals associated therewith. Thus removing link E allows the Auxiliary Two input to have priority over Auxiliary Three.

In a similar manner removal of link B allows Auxiliary One to have priority over Auxiliary Three, removal of link C allows priority of Auxiliary One over Auxiliary Two and removal of links B and C allows priority of Auxiliary One over both Auxiliary Two and Auxiliary Three.

In practice the links are not removed but repositioned since if the link were removed the input of the gate would be open circuit and, with the components used, this would provide unreliable operation. To prevent this any input which is unused, once a link is removed, is paralleled with one of the other inputs which is in use.

If the connections from the gate outputs are not taken to the inputs of the other gates, actuation of one or more auxiliary select controls will allow signals associated with those inputs to be selected in parallel with that from the magnetic record. This system allows inputs in various combinations to be paralleled, and can function for example as a mixer.

Another arrangement of the function control switch of FIG. 1 is shown in FIG. 5. The operation of this arrangement is similar to that shown in FIG. 4 except that no inhibit control is provided, the output of each NOR gate being taken to the input of all other gates so providing the facility of selecting one channel from four, there being no output if none of the four channels are selected. Components similar to those shown in FIG. 4 have the same reference numerals. The links A, B, C, D, E and F allow various orders of priority to be assigned to the select terminals 65, 66, 67 and 68. For example, Auxiliary One may have priority over Auxiliary Two by removal of link C, Auxiliary Three by removal of link B or Auxiliary Four by removal of link A. Any combination of these links may be removed simultaneously so that, for example, if all links were removed Auxiliary One will have priority over all other channels. The Auxiliary Two channel may be given priority over Auxiliary Three by removal of link E, Auxiliary Four by removal of link D, or Auxiliary Three and Auxiliary Four by removal of links E and D. The Auxiliary Three channel may be provided with priority over Auxiliary Four by removal of the link F.

A suitable end of programme detector 4 is shown in FIG. 6. This detector detects the lack of any signal for a predetermined period which is longer than the between-titles interval and shorter than the pause between the end of the programme and, for endless loop cartridges the recommencement of the programme. For reel to reel operation the minimum length of unrecorded tape after the end of the programme should be equivalent to a time equal to the predetermined period, control voltages from the track select switch 3 controlling the direction of tape motion.

The input to detector 4 is alternatively taken from an individual track fed to track select switch 3 or from the output of track select switch 3. This signal is fed to the input at R1 of FIG. 6. The signal is amplified by two d.c. coupled common emitter amplifier stages TR1 and TR2 to a level that ensures that signals 20db down on peak recording level are of sufficient amplitude to provide a base emitter voltage for a transistor TR3 which will cause it to conduct. If no input signal is present this transistor will not conduct and the potential of the collector of transistors TR3 will be that of the supply. In this state a capacitor C5 will charge towards this potential via a resistor R11. However if the input signal is restored transistor TR3 will saturate causing capacitor C5 to discharge via diode D1. When capacitor C5 is charging and after an interval determined by the time constant of resistor R11 and capacitor C5, the potential will reach a value equal to the threshold of the trigger potential of a Schmitt circuit formed by transistors TR4 and TR5, plus the breakdown voltage of a diode D2. When this occurs the Schmitt circuit will change state causing the emitter of transistor TR6 to rise and thus provide the track change pulse for the track select switch 3. The state of the circuit will not change until an input signal is applied when the circuit will revert to its original state.

Manual track advance is provided by a switch S1A which applies a potential to the Schmitt circuit input causing it to change state. Manual only operation is provided by switch S1B. Switch S1B prevents capacitor C5 from charging.

The control voltages on the outputs of the logic gates of the track select switch 3 and the function select switch 13 are available for signalling and other purposes such as control of the drive motor as described later. A suitable indication arrangement is shown in FIG. 7. This arrangement provides a method of track indication which, since it draws little current when the unit is switched off, does not load the built-in memory. The function select control voltages are combined in order to illuminate one lamp only irrespective of which auxiliary input is selected.

Each track indicator comprises a lamp LP1-4 in the collector circuit of a corresponding transistor TR7–TR10. Each transistor is biased by a resistance network 71, 72 so as to conduct current unless the voltage on the respective cathode of the diodes D4–D7 is held at negative supply, when the corresponding transistor will not conduct. In normal operation of the tape playback unit one control voltage will be at positive supply potential and three at negative supply potential. The three negative voltages will forward bias the diodes (D4–D7) preventing the associated track indicator lamp from lighting, the positive voltage on the selected track control will reverse bias the diode thus the current through the corresponding transistor for that track indicator will be controlled by the resistor network. When the playback unit is switched off the supply voltage of the indicator arrangement will fall to zero while the track select switch logic supply will be maintained by the memory. Thus any positive voltage at the output of the logic gates will reverse bias the diodes D4–D7 preventing the circuit loading the memory power supply.

If a positive voltage from any of the function select switch gates is applied via diodes D9–D10 to the base circuit of a transistor TR11 a lamp LP5, indicating that an auxiliary input has been selected, will be illuminated. In this arrangement there is no indication of which particular auxiliary input has been selected. If an indication of which auxiliary input is selected then the control voltages of the various auxiliary inputs must be taken to an individual lamp circuit similar to that used for track indication.

In certain applications of the tape playback machine the music is played for short intervals at various times of the day. With this type of operation if the amplifiers are muted and the tape allowed to run, it is possible for the music on the tape to be inadequately utilised, thus if music were played for 15 minutes every hour and the music programme was of 1 hour duration the same music would be played each time and three quarters of the programme would be wasted.

On other occasions the machine may be used for a considerable period as an amplifier for a signal fed to one of the auxiliary inputs. In this case the tape transport mechanism and the tape within the cartridge run unnecessarily increasing the wear of these parts.

In order to overcome these features the motor may be controlled, from the logic control voltages, by a circuit such as is shown in FIG. 8, so that it is switched off whenever the signal is muted or if an auxiliary input is selected for more than a predetermined inverval. The incorporation of the delay allows the music to be muted before the motor switches off preventing the audio 'run down' being heard. It also ensures that short announcements can be made without the motor switching off.

The motor M which is operated on the main supply voltage is controlled by a bidirectional semi-conductor controlled rectifier (triac 73), which is wired in series with the motor. Triac 73 acts as an open circuit in the absence of a control signal on its gate terminal 74, but if a steady state or pulsed signal of sufficient amplitude is applied to gate 74 triac 73 will conduct in both directions. Since triac 73 is switching an inductive load a capacitor - resistor network, 75, 76 is placed across the triac main terminals to ensure reliable operation. In order to isolate the low voltage power supply from the mains supply the trigger signals for the triac are of the pulsed type, coupling between a pulse generator and gate 74 being via a transformer 77.

The pulses for controlling gate 74 are derived from a square wave generator which is gated by control voltages taken from the 'Function select switch' or the muting circuit. The square wave generator is constructed from two NOR gates 78, 79 wired as an astable multivibrator, the frequency being determined by resistor 80 and capacitor 81, resistor 82 being included to reduce the effects of variations in the supply voltage. One input of NOR gate 78 is used as a control terminal for the oscillator which will operate only when this terminal is connected to negative supply (logic level 0).

If a logic level 1 is applied to 'Motor Control terminal 2' a capacitor 83 will commence to charge to this level (positive supply) via resistor 84. After a time determined by the time constant of the network the voltage on the input to NOR gate 78 will rise to a level at which oscillation will cease. Thus the square wave output which is fed via a buffer amplifier 85 to transformer 77 will case and triac 73 will switch off causing the motor to stop. When Motor control terminal 2 is removed from logic level 1 capacitor 83 discharges via a diode 86 and resistor 87, the time constant of this network being shorter than that of the charging circuit. This will restore operation of the multi-vibrator.

As the control voltage available may not be at logic level 1 but at level 0 an alternative control terminal is provided which is taken to the charging circuit via an inverter 88 which converts logic level 0 to level 1. Resistor 89 holds this input at level 1 when no external control is applied. Diodes 90 and 91 isolate the two inputs from each other.

The output from the multi-vibrator is fed to the input of two NOR gates 85 connected in parallel which act as a buffer between the multi-vibrator and the transformer 77. The two gates are connected in parallel in order to provide sufficient drive current to trigger triac 73, resistor 92 limiting the current to a safe value and with pulse transformer 77 forms a differentiating circuit resulting in the generation of pulses from the square wave. These pulses are at a sufficiently high rate to cause triac 73 to switch on at the start of each cycle of the mains supply thus applying full power to the motor.

When used with a tape playback machine switched to the automatic mode of operation using an end of programme detector of the silence detecting type switching off the motor will cause a loss of signal which will be equivalent to an end of programme pause. This pause will generate a track change pulse and the next track will be selected. To prevent this the gating signal of the multi-vibrator is monitored and taken to an inverter 93 the output of which may be taken via isolating diode 94 to the switch inhibit terminal of the pause detector effectively causing this to operate in the manual mode when the motor is switched off.

Although NOR gate elements are used in the circuit since the same elements are used in other parts of the machine, other types such as NAND gates are equally effective in the circuit.

The circuit described may be used in a reel to reel tape play-back machine to control the direction of tape travel under the control of the track select switch. In this case two circuits each control a motor one for driving the tape in one direction for say tracks 1 and 3 and the other for driving the tape in the reverse direction for tracks 2 and 4. Alternatively triac 73 may control a solenoid which governs the direction of tape motion.

If two or more of the auxiliary inputs to the Function Select Switch 13 are microphone inputs and the priorities previously described are incorporated into the unit the indicator system described in FIG. 7 may not be adequate to prevent incorrect operation. The occasion could arise when auxiliary station 2 is making an announcement when station 1, which has priority, breaks in to make a more important announcement. With the indicator circuit shown in FIG. 7 light LP5 which indicates that an auxiliary input has been chosen will be illuminated during both announcements and, unless both stations are monitoring the output of the unit, station 2 will not know that the message from this station has been interrupted and station 1 does not know for certain that it has taken over.

In order to overcome this deficiency a circuit shown in FIG. 9 may be used whereby each auxiliary station has an indicator lamp which gives an indication of the state of the system. If the lamp is extinguished no auxiliary position has been selected, if the lamp is illuminated then a position has been selected. If the lamp is steady then a position other than the lamp position has been selected, if the lamp is flashing then the position where the lamp is situated has been selected. Thus in the example quoted above the lamp at station 1 would have a steady illumination, indicating another station is making an announcement, until station 1 breaks in when the light would flash to indicate this channel has taken over. At station 2 the lamp which was flashing would become steady as an indication that another station had interrupted.

FIG. 9 shows a four station arrangement but need not be limited to this number of stations. As the operation of each channel is similar the operation of one channel only will be described.

With no auxiliary input selected the control voltages fed to the unit will be at negative supply thus transistor TR12 will be in the non-conducting state and its collector will be at positive supply potential. Transistor TR13 will be non-conducting also, as the bias current for the base of the transistor is sinked via diode 100, and the collector of this transistor and therefore the emitter of transistor TR14 will be at positive supply potential. Hence the indicator lamp LP6 which may be external to the equipment, will not be lit.

If any auxiliary position other than station 1 is selected the control voltage for the selected channel will rise to a positive potential (the positive supply voltage for the Function Select Switch 13) and will provide base bias for transistor TR12 via one of the diodes 102, 103, or 104 switching the transistor fully on so that its collector will be at negative supply. Since the control voltage of station 1 is at negative supply the emitter of transistor TR14 will be at positive supply (approx.) and the supply voltage will be applied across the lamp LP6 causing it to light with a steady glow.

If auxiliary station 1 is selected the voltage of this control line will be positive switching on transistor TR12, via diode 101 and since the control voltage is higher than the potential at the junction of resistors 105 and 106 reverse biasing diode 107. If the voltage on the cathode of diode 108 is positive also the state of transistors TR13 will be governed by the potential divider 105, 106. This is designed to cause transistor TR13 to conduct fully thus the potential at transistor TR14 emitter will be at negative supply level. Consequently both terminals of lamp LP6 will be a negative supply and the lamp will be unlit. Diode 108 cathode is connected to the output of two NOR gates 109, 110 wired as a slow running astable multi-vibrator whose output alternates between negative supply and a positive potential sufficient to reverse bias diode 108. During the periods when the multi-vibrator output is at negative supply the base current for transistor TR13 will be drained by the multi-vibrator and the transistor will switch off causing transistor TR14 emitter to rise to positive supply and the lamp to light. During the period when the multi-vibrator output is positive transistor TR13 will conduct and the lamp will extinguish. Thus the lamp will flash at a rate governed by the multi-vibrator.

If desired circuits similar to the Track Select Switch 3, Function Select Switch 13 and the arrangement of FIG. 5 may be used with inputs and output reversed in order to feed one signal to one of a number of channels, so that, for example, music is fed to one part of an installation, music and paging is fed to another part of the installation, and paging only is fed to a third area.

What is claimed is:

1. Apparatus for processing a magnetic record having a plurality of tracks providing a signal output selected from at least one of said tracks and sequentially progressing from track to track, which apparatus includes a signal path switching arrangement in which each one of a plurality of signal paths is established in sequence between one of said plurality of tracks and an output terminal through the intermediary of a semi-conductive control device with a control electrode, said device being arranged to establish or block said signal path for transmission of a signal from the corresponding track by application to said control electrode thereof of a control potential, a counter for establishing a programmed control sequence from one track to another, and a plurality of gates responsive to said counter to apply said control signals to the respective devices, to thereby select one of said tracks.

2. A magnetic record apparatus according to claim 1 in which said signal path switching apparatus has a pair of signal paths established between a pair of tracks and a pair of output terminals.

3. Apparatus as claimed in claim 1, wherein said counter comprises a plurality of binary counters, the outputs of which are connected to the inputs of said gates according to the number of track selections required in an arrangement such that an output is provided from a different one of said gate circuits for each count of the binary counters.

4. Apparatus as claimed in claim 1 including indicator means wherein a plurality of control potentials each controlling a respective signal path, are taken to an indicator comprising indicating devices in respective circuits of said devices, the arrangement being such that the indicator device indicates the signal path which has been established.

5. Apparatus as claimed in claim 1, including at least four tracks wherein the counter comprises an assembly of bistable trigger circuits so interconnected as to establish and block the signal paths in a predetermined sequence in said four tracks in response to successive switching signals applied to said counter.

6. Apparatus as claimed in claim 5, wherein the assembly of trigger circuits are connected to form said counter and set-reset means for said counter to produce a number of signal states corresponding to the number of tracks whereby said counter can be set to select a starting track for said signal output.

7. Apparatus as claimed in claim 1, having means for independently translating each track into an electrical signal, means for providing a signal path for each signal to an input terminal of said path switching arrangement, said output terminal of which is connected to a power amplifier.

8. Apparatus as claimed in claim 7, wherein said counter is provided with counting pulses from a pulse generator automatically causing a change of track selection on receipt of each pulse.

9. Apparatus as claimed in claim 8 and including a track advance switch causing the pulse generator to generate a pulse when actuated.

10. Apparatus as claimed in claim 8 including an end of programme detector which detects a pause of more than a predetermined time interval in the signal in the selected signal path and means energising said pulse generator therewith to generate a pulse.

11. Apparatus as claimed in claim 10, wherein an auto/manual switch circuit is provided which when actuated inhibits the end of programme detector from causing the pulse generator to generate pulses.

12. Apparatus as claimed in claim 10, wherein the input to the end of programme detector is taken from the output of the track selection switch.

13. Apparatus as claimed in claim 10, wherein the end of programme detector comprises a time constant capacitor charging circuit which charges the capacitor in the absence of an input to the detector but discharges and maintains discharge of the capacitor in the presence of an input, and threshold means being provided for detecting when the capacitor has charged to a predetermined level representing a predetermined interval of time.

14. Apparatus as claimed in claim 13, wherein the means for detecting when the capacitor has charged to the predetermined level is a Schmitt circuit which provides an output pulse each time the predetermined level is achieved.

15. Apparatus as claimed in claim 8 including means to change the track selection manually by a track selection switch which generates a pulse from said generator at each actuation.

16. Apparatus as claimed in claim 15, wherein the output of the track selection switch passes through an equalisation amplifier which automatically varies in amplification so as to maintain a substantially constant level of signal irrespective of the track selected.

17. Apparatus as claimed in claim 15 wherein the output signal of the track selection switch passes to a function select switch selecting signals from the track selection switch and at least one other auxiliary source to be reproduced by the apparatus.

18. Apparatus as claimed in claim 17 wherein said other auxiliary sources of signals include microphones and radios.

19. Apparatus as claimed in claim 17, wherein an indicator is associated with the function select switch, which indicator indicates which of said other auxiliary sources has been selected.

20. Apparatus as claimed in claim 17, wherein the record is driven by a motor and means is provided for stopping said drive motor of the multi-track reproducing apparatus if an auxiliary source is selected for more than a predetermined interval.

21. Apparatus as claimed in claim 17, wherein the function select switch comprises a signal path switching arrangement in which said signal path is established through said semi-conductive control device.

22. Apparatus as claimed in claim 21, wherein one said semi-conductive control device is associated with each of the plurality of tracks and is arranged to have said control potential applied to it over a separate control potential line.

23. Apparatus as claimed in claim 22, including said switching arrangement producing the control potentials, and further switching means being associated therewith for manual selection or inhibition of said signal paths.

24. Apparatus as claimed in claim 17, including one said gate circuit corresponding to the signal path for the signal from said path switching arrangement and a further gate circuit corresponding to each auxiliary source, the outputs of each auxiliary source gate circuit being connected to the input of every other gate circuit and means being provided to selectively enable one of the auxiliary sources to have priority over the others.

25. Apparatus as claimed in claim 24, wherein each gate circuit is provided with inhibit means whereby each gate circuit output can be selectively inhibited.

26. Apparatus as claimed in claim 24, wherein the output of every gate circuit is connected to the input of every other gate circuit.

27. Apparatus as claimed in claim 24, in which priority of one auxiliary source is provided over another, including indicator means wherein one kind of indication is given when a source is selected and is connected through the function select switch and a second kind of indication is given when selection is made but connection is not established or is blocked by a priority selection.

28. Apparatus as claimed in claim 27, wherein the one kind of indication is that provided by a lamp flashing and the other kind of indication is that provided by a steadily lit lamp.

29. Apparatus as claimed in claim 28, wherein each lamp is in circuit with a transistor pair arrangement, of which one of the inputs is connected to a low frequency multivibrator so as to cause the lamp of the selected source to flash when the signal path through the function select switch is established.

* * * * *

UNITED STATES PATENT OFFICE
CERTIFICATE OF CORRECTION

Patent No. 3,823,414 Dated July 9, 1974

Inventor(s) Philip Hodgson et al.

It is certified that error appears in the above-identified patent and that said Letters Patent are hereby corrected as shown below:

Column 4, line 41, "vent" should read -- event --.

Column 5, line 23, "output" should read -- input --.

Column 9, line 47, "case" should read -- cease --.

Column 6, line 27, insert -- will -- between "record" and "be".

Column 11, line 2, "diode 100" should read -- diode 107 --.

Signed and Sealed this

*twenty-sixth* Day of *August 1975*

[SEAL]

*Attest:*

RUTH C. MASON
*Attesting Officer*

C. MARSHALL DANN
*Commissioner of Patents and Trademarks*